April 14, 1970     C. P. TUBBS     3,505,798
VEGETATION CUTTER
Filed Oct. 12, 1967     2 Sheets-Sheet 1
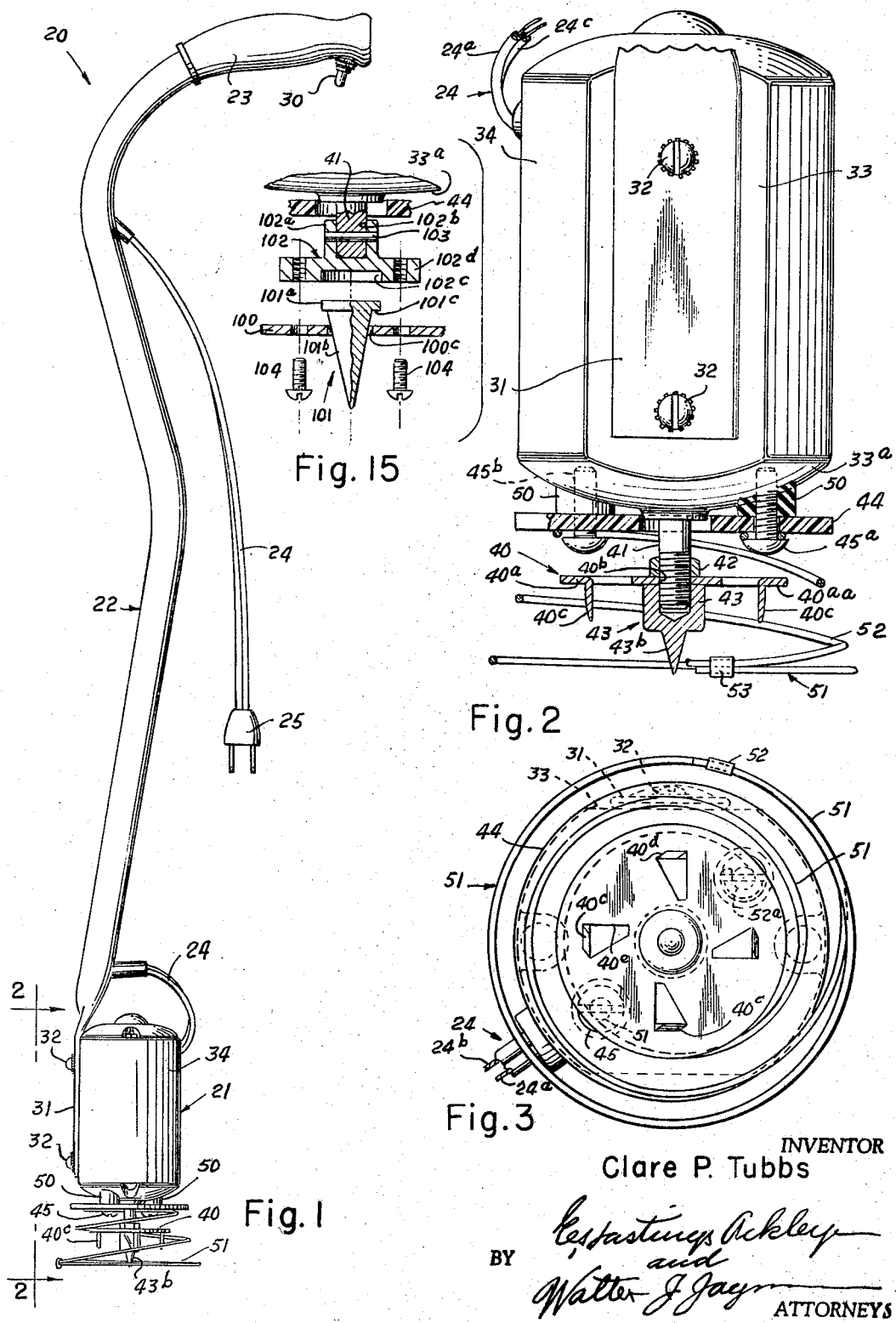
INVENTOR
Clare P. Tubbs
BY
ATTORNEYS April 14, 1970 C. P. TUBBS 3,505,798
VEGETATION CUTTER Filed Oct. 12, 1967 2 Sheets-Sheet 2

INVENTOR
Clare P. Tubbs

BY
ATTORNEYS

United States Patent Office 3,505,798
Patented Apr. 14, 1970

---

3,505,798
VEGETATION CUTTER
Clare P. Tubbs, 1400 Apache St.,
Richardson, Tex. 75880
Filed Oct. 12, 1967, Ser. No. 674,792
Int. Cl. A01d 35/26
U.S. Cl. 56—25.4                 13 Claims

ABSTRACT OF THE DISCLOSURE

A rotary power vegetation cutter including a handle, a motor on the handle, a rotary cutter blade assembly on the motor shaft including cutting teeth radially spaced from the axis of rotation of the blade assembly and circumferentially spaced from each other, and an open ended flexible protector around the blade.

---

This invention relates to vegetation cutters and more particularly relates to a weeder.

It is an object of this invention to provide a new and improved vegetation cutter and particularly to provide a new and improved rotary cutter power driven weeder.

It is another object of this invention to provide a rotary power weeding device which mutilates or destroys both surface vegetation and near-the-surface root structure.

It is another object of the invention to provide a weeder including a motor with a handle for manual support of the motor with its shaft generally vertical.

It is another object of the invention to provide a weeder having a motor shaft supported blade assembly having a center point and circumferentially spaced cutter teeth or blades extending parallel to the axis of the motor shaft and spaces laterally therefrom.

It is a still further object of the invention to provide a weeder having an open-ended resilient protector and support cage around its blade assembly for protection of an operator and to support the weeder on the surface of the ground so the cutter blades or teeth are fed into weeds and the soil at a substantially constant rate and without undesired lateral displacement.

Additional objects and advantages of the invention will be readily apparent from the reading of the following description of a device constructed in accordance with the invention, and reference to the accompanying drawings thereof, wherein:

FIGURE 1 is a side elevation of a weeder embodying the invention;

FIGURE 2 is an enlarged fragmentary front view, partly in elevation and partly in section, of the motor and cutting head of the weeder of FIGURE 1, taken on the line 2—2 of FIGURE 1;

FIGURE 3 is a bottom end view of the cutting head shown in FIGURE 2;

FIGURE 15 is a fragmentary sectional view of an alternate arrangement for mounting a blade assembly on the motor shaft of the weeder.

Figure 4:
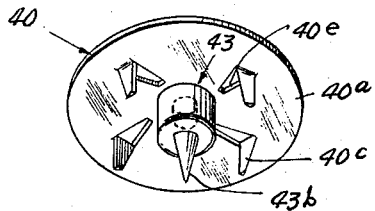
FIGURE 4 is a perspective view of the blade assembly of the weeder of FIGURES 1-3.

Referring to the drawings, a vegetation cutter 20 embodying the invention includes a cutting head assembly 21 secured to a handle 22 for manually supporting the assembly at a position at which its longitudinal axis is approximately perpendicular to the surface of the soil and vegetation being cut by the apparatus.

The handle 22 has a hand grip 23 secured along an upper end portion for support by an operator. A suitable electric cord 24 including at least two conductors 24a and 24b extends through the handle to the cutting head. A male plug 25 on the cord is connectable into a conventional outlet or the female plug on an extension cord (not shown). One of the conductors of the cord 24 has a manually operated switch 30 in the hand grip 23 connected in said conductor for controlling the flow of electricity to the electric motor 34 of the cutting head assembly. The handle 22 is shown as having a flattened lower end portion 31 secured by bolts 32 to a flat face 33 of the housing of the electric motor 34.

The cutting head assembly 21 includes a cutter blade assembly 40 mounted on an exposed free end portion of the shaft 41 extending from one end of the motor housing. The blade assembly is threaded on the shaft against a lock nut 42 which limits the extent to which the assembly fits over the shaft and aids in locking the assembly on the shaft.

The cutter blade assembly includes a hub 43 having an internally threaded cylindrical portion 43a and a conical point or tip portion 43b. The hub holds the blade on the shaft against the lock nut 42 and the point thereof functions as a guide engaging the soil to hold the cutters against lateral deflection as the blade assembly is forced downwardly into the soil to cut the vegetation.

The cuter blade assembly 40 has a circular, flat body or plate portion 40a provided with a central hole or opening 40b which receives the shaft 41 on which the blade is mounted. For purposes of reference only the face 40a of the plate shall be termed a lower face as the cutter is most generally operated with the axis of rotation of the shaft 41 and the blade assembly 40 carried thereby in a generally vertical position, though it will be understood that the cutter is operable at any position of the cutting head. Cutting blades or teeth 40c are formed integral with the body portion 40a and are spaced radially from the center or rotational axis of the shaft and the body portion and circumferentially about the shaft from each other. The teeth each extend or project from the lower face of the plate portion substantially in the direction of the axis of rotation of the blade assembly. Each of the teeth has a sharpened cutting edge 40d facing in the direction of rotation of the blade. The blades are formed by suitable means such as by stamping them from the plate portion of the blade assembly, leaving openings 40e in the plate portion at the base of each tooth having generally the same shape as the tooth stamped therefrom. The blade assembly 40 is rotated by the shaft 41 so that the teeth 40c engage the vegetation to be cut as the head is moved downwardly into the vegetation. Thus, the teeth tend to make a generally circular cut generating a cylindrical cut having an axis common with the axis of rotation of the shaft 41 and of the blade assembly as it is moved into vegetation along the axis of the shaft.

A circular mounting plate 44 is secured to the motor by bolts 45 against beveled washers 50 disposed on the bolts between the plate and the lower spherical end surface 33a of the motor. The mounting plate has a central opening 45a through which the motor shaft 41 extends. A resilient support member and protector cage 51 surrounds the blade assembly 40 and is supported from the mounting plate and extends from the bottom face of the plate around the blade assembly to a point about adjacent the point or tip 43b of the hub. The protector and support member comprises a coiled spring 52 secured at its upper end portion against the lower face of the plate 44 by the bolts 45. Such upper end of the spring is formed in a loop 52a secured by the bolt 45a to the plate while an eye at the end of the spring is clamped between the head of the bolt 45b and the plate. The lower end portion of the spring is formed in the shape of a circle or closed loop 52b with the free lower end of the spring being clipped by a bracket 52 to an intermediate portion of the spring to form the loop, which is larger in diameter than the cutter blade assembly. The spring 51 serves a safety function by enclosing the blade assembly, and resiliently supports the motor and cutter blade assembly above cutting position while being yieldable to permit the cutter blade assembly to be moved downwardly for cutting. The circular lower end of the support and protector is open so that the cutter blade assembly is movable through the loop 52b as the spring is compressed to expose the blade teeth for cutting vegetation.

A particularly important application of the vegetation cutter is in the elimination of troublesome grasses and weeds, such as crab grass, Dallis grass, Johnson grass and the like. These forms of undesirable vegetation tend to grow in clumps, which are difficult to remove by pulling or cutting but which generally may be destroyed by cutting into their central core or body portion which grows slightly above ground level and from which the roots of the plant extend into the ground.

The weeder 20 is connected with a suitable source of electricity by the plug 25 on the free end of the cord 24 (FIGURE 1). The weeder is manually supported at a position substantially perpendicular to the surface of the soil supporting the vegetation and over the center of the clump of vegetation to be destroyed. The cutting head assembly is placed on the ground with the lower loop 52b of the support and protector resting on the surface of the ground around the vegetation to be destroyed. As the cutting head assembly moves toward the ground, the tip portion 43b of the hub enters the earth near the center of the plant and penetrates the core of the plant. The spring 51 preferably supports the cutter head above the ground surface sufficiently that the teeth 40c are above cutting positions with respect to the plant to be destroyed. With the cutter so positioned, the switch 30 in the handle is moved to "on" position to supply power through the cord 24 to the motor 33 for rotating the shaft 41 carrying the cutter blade assembly. With the blade assembly rotating, downward pressure by the operator forces the cutting head downwardly against the spring 51 which is compressed toward the plate 44 by the soil surface as the cutting head moves downwardly. The tip or pointed end portion 43b of the hub penetrates the plant and soil as the cutting head is forced downwardly, so that when the teeth 40c are exposed beyond the compressed protector they engage portions of the plant and the tendency of the rotating blade assembly to move the cutting head laterally is resisted by the penetration of the point into the earth. As the teeth 40c rotate, they cut, tear, and otherwise thoroughly destroy those portions of the plant engaged by them. The hub tip generally holds the cutting head so that it does not drift laterally across the soil surface as it is being forced downwardly into the plant and soil. The spring 51 provides support for the cutting head and resists its downward movement so that the blade teeth are fed slowly and smoothly into the plant to minimize entanglement of the blade assembly and possible stalling of the motor. Thus, the blade is fed into the plant at a rate which permits it to thoroughly cut as it moves downwardly. If one full cut of the blade assembly through a plant does not completely destroy it, the cutting head assembly is lifted with its point portion being placed at another location, and cutting resumed as already discussed. The cutting head may thus be moved and cuts made at various locations into the plant until it is destroyed. The downward movement of the cutter made possible by its downwardly projecting teeth on its blade assembly is to be particularly distinguished from the generally lateral or horizontal movement of a conventional rotating type lawn mower.

FIGURES 5-8 illustrate another form of a cutter blade assembly 60 for use in the weeder. The assembly 60 has a circular plate 61 provided with a plurality of openings 63 uniformly spaced from the center of the plate and circumferentially spaced from each other. A hub 64 having a cylindrical body portion 64a and a conical tip or point portion 64b is formed integral with the plate for securing the blade on the shaft of the motor and guiding the blade downwardly, as already discussed. An internally threaded blind bore 56 in the hub opens through the top face of the plate 61 for threading the blade assembly on the shaft 41. The nut 42 is threaded on the shaft prior to the blade assembly to limit the extent to which the blade assembly is threaded on the shaft and to lock the assembly on the shaft as already discussed. A plurality of circumferentially spaced cutter teeth 70 are supported from the plate extending downwardly from its lower face 61a. Each tooth 70 has an externally threaded stud 71 formed integral with the tooth and extending upwardly from the upper face 72 of the tooth for securing the tooth to the plate. The stud 71 of each tooth is disposed through one of the holes 63 in the plate 61 with the upper end face 72 on the tooth engaging the lower face of the plate. A nut 73 is threaded on the stud 71 of each tooth above the plate pulling the tooth end face 72 against the lower face of the plate to secure the tooth firmly to the plate. The tooth is aligned generally such that its side faces 70a are perpendicular to a hypothetical radius line drawn from the center of the plate through the center line or axis of the stud 71 of the tooth, and cutting edges 70b and 70c are formed on the longitudinal edges of the teeth. The blade assembly 60 is supported on and rotated by the shaft 41 of the motor for cutting vegetation in the same manner as already discussed. The teeth 70 perform the same cutting function as the teeth 40c of the blade assembly 40.

Figure 9:
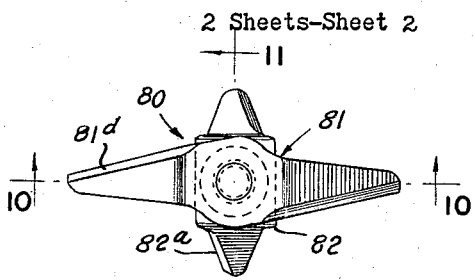
FIGURE 9 is a top view of a further form of blade assembly for the weeder.
Figure 5:
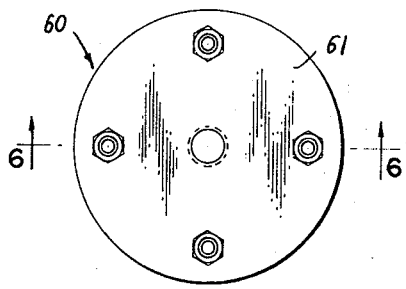
FIGURE 5 is a top view of a modified form of blade assembly for the weeder.
Figure 10:
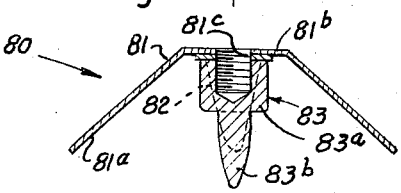
FIGURE 10 is a view in section taken along the line 10—10 of FIGURE 9.
Figure 6:
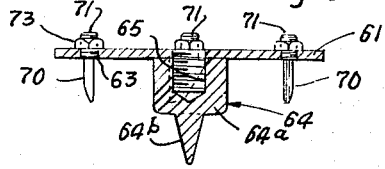
FIGURE 6 is a view in section taken along the line 6—6 of FIGURE 5.
Figure 11:
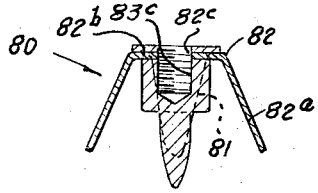
FIGURE 11 is a view in section taken along the line 11—11 of FIGURE 9.
Figure 7:
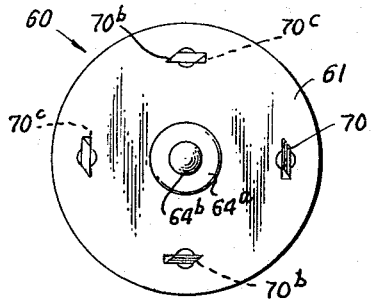
FIGURE 7 is a bottom end view of the blade assembly of FIGURES 5 and 6.

Another form of cutter blade assembly 80 for use in the cutting head 21 of the cutter is illustrated in FIGURES 9-11, and includes an outer blade member 81, an inner blade member 82, and a hub 83. The outer blade member has a pair of downwardly divergent tapered or triangular shaped cutter blades 81a, each formed integral with and on opposite sides of a central body portion 81b. The body portion 81b has a central opening 81c to receive the shaft 41 of the motor of the weeder. Each of the blades 81a has a cutting edge 81d. The inner blade member 82 also has a pair of downwardly divergent blades 82a formed integral with and supported from a central body portion 82b provided with a central opening 82c to receive the shaft of the motor. Each of the blades 82a has a cutting edge 82d. The degree of divergence of the blades of the inner plate member is substantially less than that of the blades of the outer blade member is within the cut made by the outer blade member. The lengths of the blades of the inner and outer blade members are so related that the tips of all of the blades are disposed in substantially the same plane, FIGURES 10 and 11. The hub 83 has a cylindrical body portion 83a and a point or tip portion 83b extending beyond the blade tip so that it enters the soil before the blade tip during cutting. The cylindrical portion 83a is provided with an internally threaded blind bore 83c which is aligned with the openings through the inner and outer blade members and is threaded on the shaft 41 of the motor for supporting the blade assembly in the cutting head. The inner and outer blade members and the hub of the blade assembly are preferably suitably secured together as by welding to form a unitary assembly, though they may comprise separate members which are assembled and secured together on the shaft 41. The blade assembly 80 operates in the cutting operation as already described, except that the inner and outer blades make concentric cuts into the plant as distinguished from a single circular cut effected by the blade assemblies 40 and 60.

Figure 12:
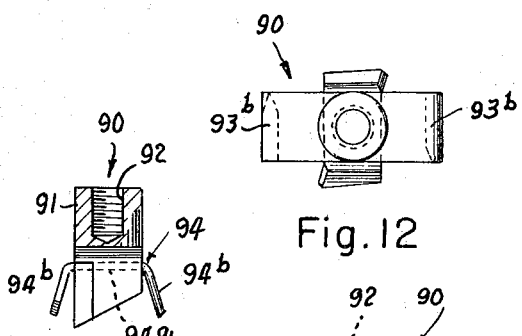
FIGURE 12 is a top plan view of a still further form of blade assembly.
Figure 8:
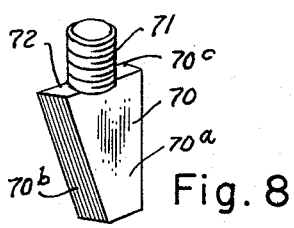
FIGURE 8 is an enlarged perspective view of one of the cutter blades of the blade assembly of FIGURES 5-7.
Figures 13, 14:
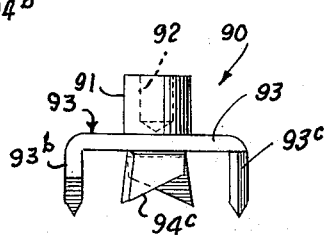
FIGURE 13 is a side elevation of the blade of FIGURE 12 showing parts in section.
FIGURE 14 is a side elevation of the blade assembly taken at right angles to FIGURE 13.

A still further form of blade assembly 90 is illustrated in FIGURES 12–14, and has a cylindrical hub 91 provided with an internally threaded blind bore 92 to receive the motor shaft 41 for holding the blade assembly on the shaft of the motor. The blade assembly includes an outer blade member 93 and an inner blade member 94. The outer blade member includes a central rectangular body portion 93a extending substantially perpendicular to the axis of the hub 91 and downturned integral blade portions 93b with cutting edges 93c extending perpendicular to the body portion 93a. The inner blade member 94 has a central body portion 94a extending substantially perpendicular to the longitudinal axis of the hub supporting downward turned divergent integral blade portions 94b having cutting edges 94c for cutting in a circular pattern concentric with and within the circular cutting path of the outer blade portions. The body portion 94a of the inner blade member is substantially shorter than the corresponding portion of the outer blade member so that the blades of the inner blade member move within the path of the blades of the outer blade member. The body portions of the blade members and the hub 91 are suitably secured together as by welding to provide a unitary blade assembly which is secured on and operated by the motor shaft in the same manner as already discussed in connection with the other forms of blade assemblies shown.

It will now be seen that a new and improved vegetation cutter or weeder has been described and illustrated, which is adapted to mutilate or destroy both surface vegetation and root structure to the depth that its blade assembly is forced into the soil supporting the plant.

It will also be seen that the weeder includes a motor driven cutting head secured on a handle for manually supporting the cutting head at a position substantially perpendicular to the surface of the soil supporting the plant being cut.

It will also be seen that the cutting head of the weeder includes a motor shaft supported blade having circumferentially spaced teeth extending longitudinally therefrom in substantially the same general direction as the longitudinal axis of the motor shaft, and that the pointed tip of the cutter blade assembly limits or obviates lateral displacement during cutting.

It will be further seen that the cutting head of the weeder has a resilient open-ended support and protector cage supported around the blade assembly to protect an operator and to resiliently support the weeder on the surface of the ground so that it is forced into the plant being cut at a generally steady rate.

It will be further seen that a variety of forms of blade assemblies for use in the weeder have been described and illustrated, including a form having removable cutting teeth and other forms having inner and outer blades for cutting concentric circular paths.

It will be obvious that numerous modifications may be made in the various components of the weeder within the scope of the invention. The motor may be selected from a wide variety of powers and speeds. Other blade assemblies of various sizes and designs may be employed. The size of the cutter blade assembly varies with and bears a direct relation to the size of the area of vegetation to be destroyed and to the size of the motor driving it. The support and protector 51 may also be formed of a collapsible metal or plastic. Various shapes and sizes of handles, along with variations in location and design of the electric switch in the handle, may be employed as desired.

An alternate and sometimes preferred arrangement for mounting a cutter blade assembly on the motor shaft 41 shown in FIGURE 15 includes a cutter blade 100 and a guide point 101 mounted on a flanged hub 102 secured on the motor shaft by a pin 103. The cutter blade is provided with suitable teeth such as the integral teeth 40c, FIGURE 2, or the removable teeth 70, FIGURE 6, as already described.

The central hub portion 102a has a blind bore 102b which receives an end portion of the shaft 41. The pin 103 extends through aligned lateral holes in the hub and shaft. The guide point 101 has an enlarged or flanged head portion 101a received in a circular recess 102c of the flange or plate portion 102d of the hub. The blade 100 is secured to the flange portion 102d of the hub by screws or bolts 104. The body portion 101b of the guide point projects downwardly through a central opening 100e in the blade coaxial with the shaft 41 at hub 102. The upper face of the blade engages the shoulder surface 101c on the guide point head portions clamping the guide point to the hub.

The cutter blade arrangement of FIGURE 15 functions as already described with the guide point serving to hold the cutter against lateral deflection as the blade penetrates vegetation and soil.

The foregoing description of the invention is explanatory only, and changes in the details of the construction illustrated may be made by those skilled in the art without departing from the spirit of the invention.

What is claimed and desired to be secured by Letters Patent is:

1. A vegetation cutter including: power means having handle means for supporting the same and having a power shaft rotatable about its longitudinal axis; cutter blade means connected with said power shaft for rotation thereby; said cutter blade means having a central portion with a hub having a pointed free end portion extending coaxially with the axis of rotation of said cutter blade means, and having cutting portions disposed laterally outwardly of said hub and extending longitudinally in substantially the direction of the hub and rotatable about said hub as said cutter blade means is rotated; a resilient compressible support and protective cage supported from said power means about said blade means and having an open free end to permit said cutting portions and said hub of said blade means to project beyond the open end of said cage when said cage is compressed toward said blade means, said cage providing safety protection around said blade means and supporting said blade means in non-cutting relationship over an area of material to be cut before compression of said cage, the open end of said cage engaging the surface of said material as said cutter is forced toward said material compressing said cage and exposing said blade means beyond said cage end for cutting into said material, said pointed free end portion of said hub engaging said material for holding said blade means and said cutter against lateral movement relative to said material as cutting effected by said blade means.

2. A vegetation cutter as defined in claim 1 wherein said pointed portion of said hub projects farther from said central portion than the free ends of the cutting portions of said blade assembly so that said pointed portion enters material to be cut prior to engagement of said material by said cutting portions.

3. A vegetation cutter of the character set forth in claim 1 wherein said cutter blade means comprises: means on said central portion for attachment thereof to said rotatable power shaft; and said cutting portions include: a cutter body portion mounted on said central portion and projecting laterally therefrom normal to the axis of rotation thereof; and cutter blades carried by said body portion and extending angularly thereof in substantially a longitudinal direction and spaced laterally outwardly from said hub, said cutter blades being shorter in longitudinal length axially of said hub than the hub and the pointed free end portion thereof.

4. A vegetation cutter as defined in claim 1 wherein: said central portion of said cutter blade means includes a separable flange portion having a central recess opening in the direction of said pointed portion of said hub and said hub has a head portion received in said recess of said flange portion and provided with a flange surface facing in the direction of the free pointed end of said hub; said central portion being provided with a central opening smaller than said head portion of said hub whereby said central portion engages said flange surface on said hub for securing said hub against said flange portion of said central portion and said pointed portion of said hub extends through said central opening of said central portion coaxial with said power shaft; and means is provided securing said central portion to said separable flange portion of said central portion.

5. A vegetation cutter comprising: a handle for manual support of said cutter; an electric motor supported at one end portion of said handle, said motor having a shaft with a free end portion disposed downwardly when said motor is substantially vertical; a blade assembly secured on said free end portion of said shaft, said blade assembly having a central portion and cutting portions spaced laterally outwardly from said shaft and extending downwardly from said central portion when said shaft is substantially vertical; resilient compressible protective cage means supported at one end from said motor extending along and surrounding said blade assembly, and open at its opposite free end whereby said blade assembly projects through said free end of said cage means when said cage means is compressed toward said motor for exposing the cutting portions of said blade assembly, said protective cage means supporting said cutter on a surface engaging said free end of said cage means holding said blade assembly spaced from said surface with said cutting portions spaced in non-cutting relationship from said surface; and means connected with said motor for conducting electricity to said motor.

6. A vegetation cutter as defined in claim 5 including a mounting plate secured to said motor and said cage means for supporting said cage means around said blade assembly from said motor.

7. A vegetation cutter as defined in claim 6 wherein said protective cage means comprises a coil spring assembly.

8. A vegetation cutter as defined in claim 5 wherein said blade assembly includes a central hub extending along an axis of rotation coincident with the axis of rotation of said shaft and having a pointed free end portion for guiding said blade assembly and minimizing lateral deflection thereof during cutting with said assembly.

9. A vegetation cutter as defined in claim 5 wherein said blade assembly includes a hub engaged on said shaft, an outer blade member formed across the bottom of said hub having a central portion perpendicular with the axis of said hub and outer blade portions substantially perpendicular with said central portion and extending downwardly therefrom, an inner blade member having a central portion across the bottom portion of said hub perpendicular to the axis of said hub and having outer cutting portions extending downwardly from the outer ends of said central portion and divergently from each other.

10. A vegetation cutter as defined in claim 8 wherein said blade assembly includes a circular plate on said shaft perpendicular thereto and said cutting portions comprise downwardly extending teeth circumferentially spaced from each other and formed integral with said plate.

11. A vegetation cutter as defined in claim 10 wherein said teeth are each removable from said circular plate, each tooth having a lug portion extending through said plate and secured thereto by nut means.

12. A vegetation cutter as defined in claim 8 wherein said blade assembly includes an outer blade member having a central portion and outer cutting portions on opposite sides of said central portion extending divergently downwardly from each other, and a inner blade member having a central portion and cutting portions on opposite sides of said central portion extending divergently downwardly from each other, said cutting portions of said inner blade member cutting a circular path concentric with and within a circular path cut by said cutting portions of said outer blade member, and said inner and outer blade members being radially substantially perpendicular to each other.

13. A vegetation cutter as defined in claim 5 including a flanged hub having a central portion provided with a bore receiving an end portion of said motor shaft and a flange portion secured with said central portion of said blade assembly and having a central recess opening toward said blade assembly, a guide point having a head portion disposed in said recess of said flange portion and a pointed body portion extending coaxially of said shaft in the direction of said cutting portions of said blade assembly through a central opening provided in said central portion of said blade assembly, said central opening through said blade assembly being smaller than said head portion of said guide point for clamping said guide point with said flange portion of said hub, and means for securing said hub on said motor shaft.

References Cited

UNITED STATES PATENTS

| 959,003 | 5/1910 | Garwood | 56—239 |
| 2,832,184 | 4/1958 | Beverle | 56—25.4 |
| 2,953,852 | 9/1960 | Dehn. | |
| 3,011,299 | 12/1961 | Classon | 56—25.4 |

E. BARRY SHAY, Primary Examiner

J. A. OLIFF, Assistant Examiner

U.S. Cl. X.R.

56—295